No. 735,593. PATENTED AUG. 4, 1903.
A. K. ROSENBECK.
CLOTHES LINE HOLDER.
APPLICATION FILED DEC. 19, 1902.
NO MODEL.

WITNESSES.
H. H. Lamb
S. W. Atherton

INVENTOR.
Andrew K. Rosenbeck
By A. N. Wooster
Atty.

No. 735,593. Patented August 4, 1903.

UNITED STATES PATENT OFFICE.

ANDREW K. ROSENBECK, OF STAMFORD, CONNECTICUT.

CLOTHES-LINE HOLDER.

SPECIFICATION forming part of Letters Patent No. 735,593, dated August 4, 1903.

Application filed December 19, 1902. Serial No. 135,884. (No model.)

*To all whom it may concern:*

Be it known that I, ANDREW K. ROSENBECK, a citizen of the United States, residing at Stamford, county of Fairfield, State of Connecticut, have invented a new and useful Clothes-Line Holder, of which the following is a specification.

This invention relates to the class of clothes-line holders which will permit the operator to put out and take in clothes from a window or balcony, and while adapted for general use and in any position is especially adapted for use between buildings or fixtures at a distance above the ground.
It is one of the objects of the invention to provide convenient means for slackening and tightening the line and for drawing it in and out.

A further object of the invention is to provide simple and convenient means for adjustment which will permit the pulley to be swung around in the horizontal plane after the bracket has been attached in place, so as to permit the pulley to be in line with a distant support for the clothes-line—that is, so that the line in running on or running off the pulley will be in alinement with the distant support—and to lock the pulley in place after adjustment.
A further object of the invention is to provide a guide for the clothes-line that will travel in the horizontal plane with the pulley, will oscillate concentrically with the pulley, but wholly independently thereof, will permit the line to be inserted and removed without separating the ends, and will act with perfect certainty to prevent the line from slipping off the pulley when loose or from being blown to one side by the wind and so caused to run off, or will permit the upper and lower strands of the line to diverge where there are two distant points of support.

With these and other objects in view the invention consists in certain constructions and in certain parts, improvements, and combinations, which will be hereinafter described and then specifically pointed out in the claims hereunto appended.

Figure 1:
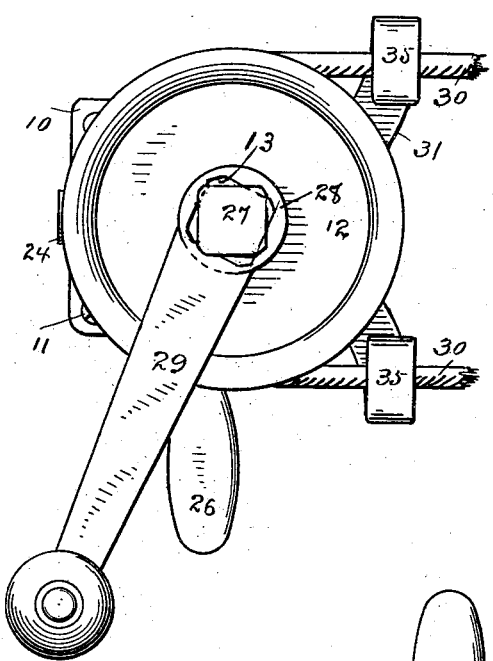
Figure 2:
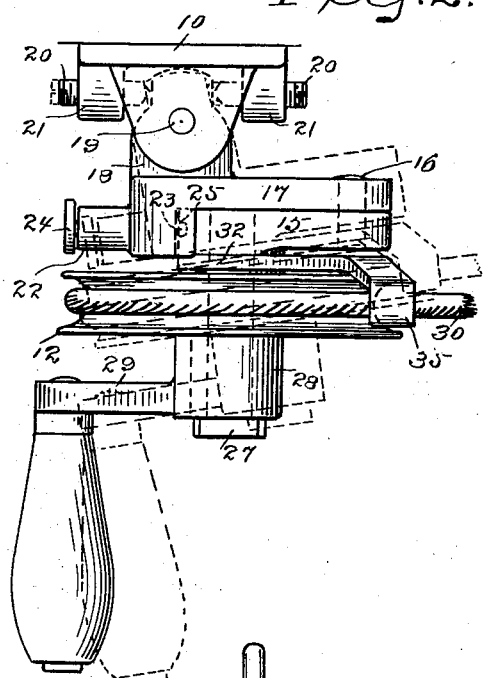
Figure 3:
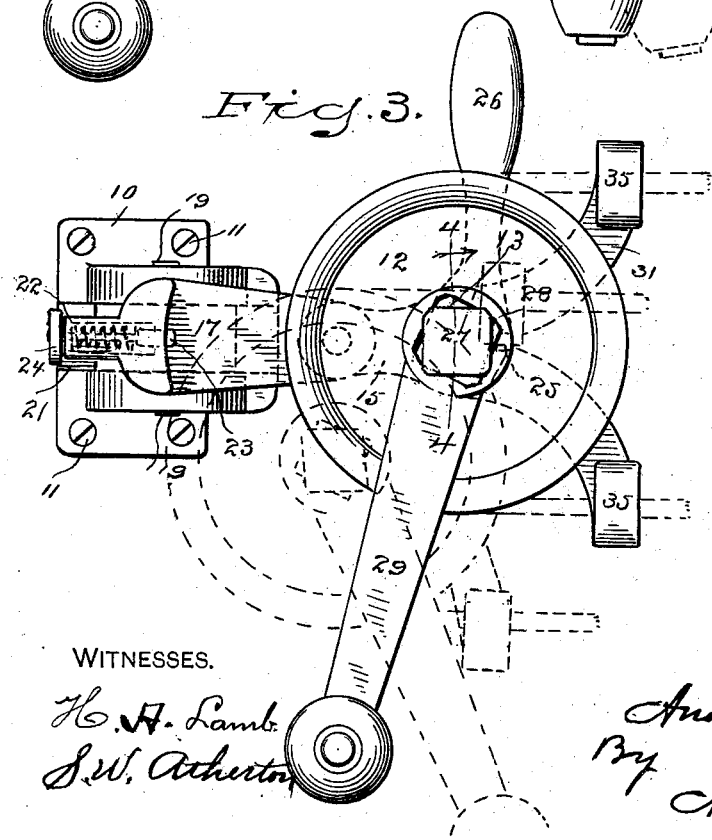
Figure 4:
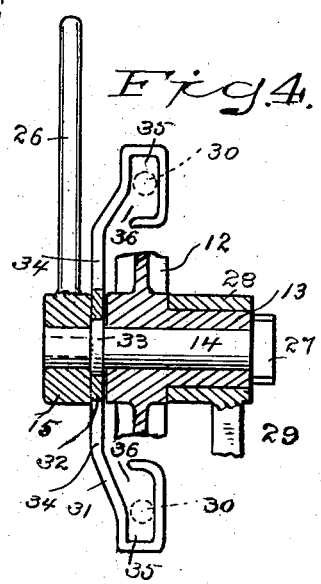

In the accompanying drawings, forming part of this specification, in which like characters of reference indicate the same parts, Figure 1 is a side elevation of my novel clothes-line holder as in use; Fig. 2, a plan view corresponding therewith; Fig. 3, an elevation showing the pulley swung out to its farthest position, as when it is desired to remove or replace a line or to slacken it for any purpose whatever; and Fig. 4 is a detail sectional view on the line 4 4 in Fig. 3, the pulley being broken away in order to show the hooked arms of the guide.

10 denotes a bracket which supports a pulley 12 and is adapted for attachment to a window-casing or a pillar in any suitable position and in any preferred manner, as by screws 11. The pulley is provided with a laterally-extending angular hub 13 and is journaled on a stud 14, which is itself riveted or otherwise rigidly secured in a swinging arm 15. This swinging arm is pivoted, as at 16, to a carrying-arm 17, which is adapted to be adjusted in the horizontal plane. The carrying-arm is provided with a lug 18, which is pivoted, as at 19, to the bracket. The rear end of lug 18 is shaped on opposite sides to adapt it for engagement by the points of set-screws 20, which are carried by lugs 21 on the bracket. Should it become desirable at any time to swing the carrying-arm, and with it the pulley, in the horizontal plane, so as to permit the latter to receive and discharge a clothes-line in direct line with a distant support, the operator loosens one or both of the set-screws, oscillates the carrying-arm sufficiently to place the pulley in line with the distant support of the clothes-line, and then locks the swinging arm and the pulley in the required position by turning in both set-screws until their points engage the rear end of lug 18. Carrying-arm 17 is provided with a socket 22, which receives a spring-bolt 23, having a head 24 for convenience in operation. The forward end of the spring-bolt is adapted to engage a recess 25 in swinging arm 15, (see dotted lines in Fig. 2,) so as to lock the swinging arm, and with it the pulley, in the operative position in which the clothes-line is carried. The swinging arm is provided with a handle 26 for convenience in operation. When the swinging arm is thrown to the operative position, as in Figs. 1 and 2, it is instantly locked there by the engagement of the spring-bolt with the recess in the swinging arm. It will be noted that the head of stud 14, which I have specifically indicated by 27, is made slightly smaller than angular hub 13, so that the eye 28 of a detachable crank 29 will slip freely over the head of the stud, while at the same time the crank will be locked in place on the stud, except when the angular opening in the eye of the crank registers with the angular head 27 of the stud, as indicated in Fig. 1.

30 denotes a clothes-line upon the pulley.

In order to retain the clothes-line upon the pulley when the pulley is swung outward, as in Fig. 3, to loosen the line or should the line become stretched in use, I provide a guide 31, which lies in the plane of the pulley and is adapted to oscillate concentrically therewith. This guide comprises a hub 32, which is mounted to turn on a boss 33 on stud 14, and arms 34, having at their outer ends eyes 35, lying in the plane of the pulley, and having lateral openings 36, through which the clothes-line may be passed freely in inserting or removing it, but which will retain the line securely at all times even when slack and in a high wind and will furthermore permit the upper and lower strands to diverge where there are two distant points of support. It should be noted that this guide while retaining the clothes-line securely upon the pulley at all times does not interfere with the free running of the line to the slightest extent. The ends of the line may be tied or otherwise united before it is placed in the eyes of the guide and upon the pulley, which is important, as the line can be made much tighter by uniting the ends before placing it on the pulley.

The operation of my novel clothes-line holder is briefly as follows: In setting up the device the bracket is attached in any convenient way, after which, set-screws 20 being loosened, carrying-arm 17 is oscillated to place it in such a position that the pulley will be in alinement with the distant point of support of the clothes-line, or should the upper and lower strand of the line diverge the pulley may be placed in alinement with a point intermediate the distant points of support. Having swung the carrying-arm, and with it the pulley, into the desired position, it is locked there by turning in both set-screws until their points engage the rear end of lug 18 on the carrying-plate. Whenever it is desired to slacken a clothes-line already on the pulley or to remove it or to place a new line thereon, the operator draws out the spring-bolt by means of head 24, which allows swinging arm 15, the pulley and the guide to drop to the position shown in dotted lines in Fig. 3 or permits it to be swung outward to the position shown in full lines in Fig. 3. To tighten the line again, the operator by means of handle 26 swings arm 15, the pulley, and the guide to return them to the position shown in Figs. 1 and 2, the spring-bolt yielding as the arm is moved to place and then engaging the socket to lock the parts in the operative position. It will be readily understood from Fig. 4 that when a clothes-line has once been placed in the eyes of the guide it will be practically impossible for it to escape therefrom under the ordinary or extraordinary conditions of use.

Having thus described my invention, I claim—

1. A clothes-line holder comprising a bracket, an oscillating carrying-arm pivoted thereto, a swinging arm pivoted to the outer end of the carrying-arm and adapted to swing backward alongside thereof, a pulley journaled upon the swinging arm and means for locking the swinging arm backward with the pulley in operative position.

2. A clothes-line holder comprising a bracket, a carrying-arm pivoted thereto and adapted to oscillate in the horizontal plane, means for locking said arm at any desired adjustment, a swinging arm pivoted to the outer end of the carrying-arm and adapted to swing backward alongside thereof, a pulley journaled upon the swinging arm and means for locking the swinging arm backward and with it the pulley in operative position.

3. A clothes-line holder comprising a bracket, a carrying-arm having a lug 18 by means of which it is pivoted to the bracket so as to swing in the horizontal plane, set-screws engaging opposite sides of said lug to lock the arm at any desired adjustment, a pulley, a swinging arm carrying the pulley and itself pivoted to the carrying-arm and means for locking the swinging arm backward with the pulley in operative position.

4. A clothes-line holder consisting of a bracket, a pulley, a support for the pulley carried by the bracket and a clothes-line guide comprising a hub mounted to oscillate concentrically with the pulley and arms having at their outer ends separate eyes lying in the plane of the pulley which receive the upper and lower strands of line and prevent it from running off the pulley, said arms extending forward and upward and downward from said hub to a point to bring said eyes to the front of the periphery of the pulley in line with each other.

5. A clothes-line holder consisting of a bracket, a pulley, a support for the pulley carried by the bracket, and a clothes-line guide comprising a hub mounted to oscillate concentrically with the pulley and arms having at their outer ends eyes lying in the plane of the pulley and having lateral openings through which the line may be passed in inserting or removing it but which will retain the line securely in use.

6. A clothes-line holder comprising a bracket, an adjustable carrying-arm pivoted thereto, a swinging arm pivoted to the carrying-arm, a pulley carried by the swinging arm, means for locking the swinging arm and the pulley in operative position and a clothes-line guide mounted to oscillate concentrically with the pulley and having eyes lying in the plane of the pulley which receive and retain the line, said arms extending forward and upward and downward from said hub to a point to bring said eyes to the front of the periphery of the pulley in line with each other.

In testimony whereof I affix my signature in presence of two witnesses.

ANDREW K. ROSENBECK.

Witnesses:
JOSEPH L. WOLFE,
JOHN WHITE.